(No Model.)
G. W. BOWE.
CULINARY DEVICE.
No. 435,962. Patented Sept. 9, 1890.
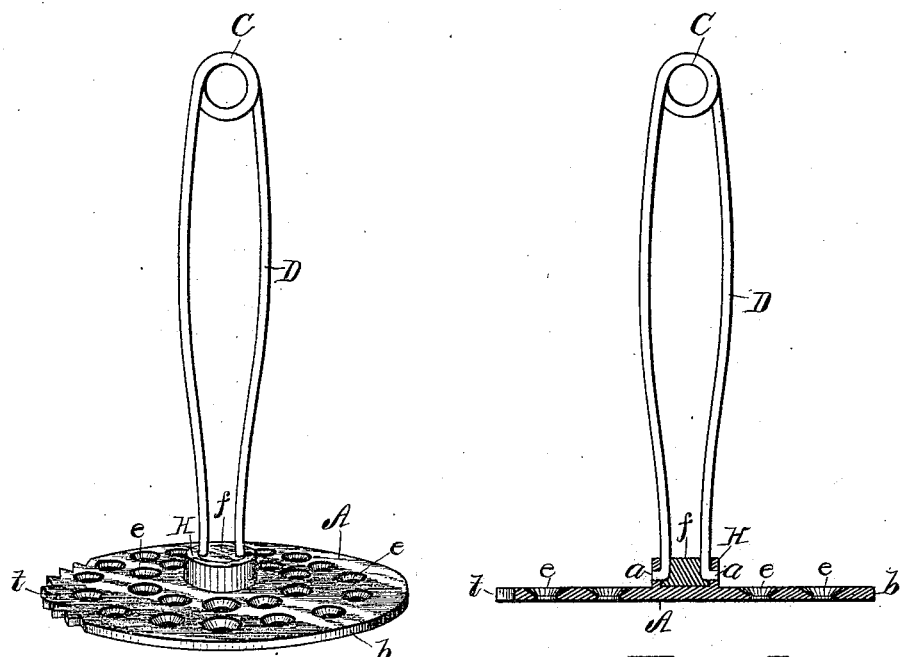
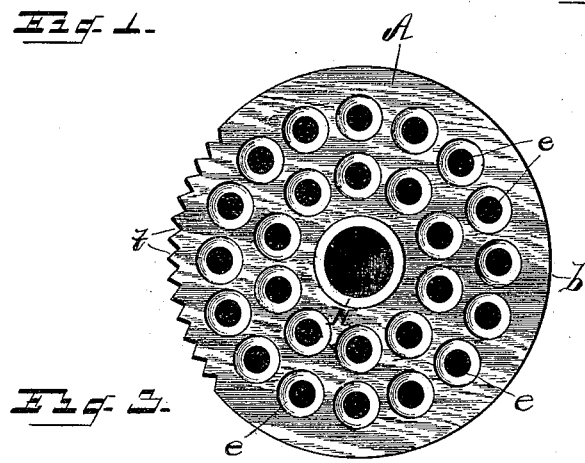
WITNESSES
INVENTOR
Geo. W. Bowe
By
Rascoe B. Wheeler
Attorney.

UNITED STATES PATENT OFFICE.

GEORGE W. BOWE, OF DETROIT, MICHIGAN.

CULINARY DEVICE.

SPECIFICATION forming part of Letters Patent No. 435,962, dated September 9, 1890.

Application filed December 9, 1889. Serial No. 333,141. (No model.)

*To all whom it may concern:*

Be it known that I, GEORGE W. BOWE, a citizen of the United States, residing at Detroit, in the county of Wayne and State of Michigan, have invented certain new and useful Improvements in Culinary Devices; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to an improved culinary device adapted to be used as a vegetable-masher, meat-pounder, and kettle-scraper; and it consists of a metal disk having a series of countersunk holes therein and having teeth or notches formed in a portion of the edge thereof and provided with a central hub or boss, in which is anchored a wire handle, by means of which the device is manipulated, all of which will be hereinafter more fully set forth, and the essential features of the device pointed out particularly in the claims.

In the accompanying drawings, forming a part of this specification, Figure 1 is a perspective view of my improved device. Fig. 2 is a central cross-section through Fig. 1, the handle being in elevation. Fig. 3 is a plan view of the disk, the handle being removed.

Referring to the letters of reference, A indicates a metal disk having a series of holes $e$ passing therethrough, said holes being countersunk from the upper face of the disk, said disk also being provided with the teeth $t$, formed in a portion on its edge, and the hollow hub H, located in the center of the disk and formed integral therewith.

D indicates a handle made of strong wire bent once around to form the ring C in the upper end thereof. The free ends of the wire are placed in the hollow hub H, their outwardly-bent ends $a\ a$ entering holes through the periphery of said hub from the inside, as shown in Fig. 2, and are anchored therein by running lead or Babbit metal in the hollow of the hub, thus firmly securing the handle D to the disk A, as clearly shown at $f$ in Figs. 1 and 2. By winding the wire once around in forming the ring C strength is added to the handle D and a larger bearing-surface afforded the hand when manipulating the disk in mashing vegetables.

To use the device as a vegetable masher, the vegetables being cooked are placed in a suitable receptacle and the disk A pressed down upon them by means of the handle D, whereby the vegetables are mashed and forced up through the holes $e$ in said disk, which separates the particles thereof and in a few minutes' operation renders the vegetables light and flaky. The holes $e$ being countersunk from the upper face of the disk, readily free themselves from the mashed vegetables and prevent the clogging of said holes.

By means of the teeth $t$ formed in the periphery of the disk the device serves as an excellent meat-pounder, and the square-turned edge $b$ of the disk affords a ready and efficient scraper for pots and kettles, the handle D serving to manipulate the device for the various operations.

Having thus fully set forth my invention, what I claim as new, and desire to secure by Letters Patent, is—

1. In a culinary device, the combination of the metal disk having a hollow hub, a series of holes through said disk, said holes being countersunk from the upper face of the disk, and the handle attached to the hub of the disk, substantially as specified.

2. A culinary device comprising the following elements: the perforated metal disk having teeth on its periphery and a hollow hub at the center having perforations therein, the wire handle having outwardly-turned parts engaging with the perforations of said hub, and soft-metal filling, as and for the purposes specified.

In testimony whereof I affix my signature in presence of two witnesses.

GEORGE W. BOWE.

Witnesses:
E. S. WHEELER,
NICHOLAS HARDOIN.